(12) United States Patent
Liu et al.

(10) Patent No.: US 8,965,639 B2
(45) Date of Patent: *Feb. 24, 2015

(54) SYSTEM AND METHOD FOR MACHINE CONTROL

(75) Inventors: Forrest Liu, Peoria, IL (US); William L. Ostler, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/545,447

(22) Filed: Jul. 10, 2012

(65) Prior Publication Data

US 2014/0019012 A1    Jan. 16, 2014

(51) Int. Cl.
*G06F 7/70* (2006.01)
*E02F 9/20* (2006.01)
*A01B 71/06* (2006.01)

(52) U.S. Cl.
CPC ............. *E02F 9/2025* (2013.01); *A01B 71/066* (2013.01)
USPC .......................................................... 701/50

(58) Field of Classification Search
CPC ..... E02F 9/2025; E02F 9/2029; A01B 71/066
USPC .......................................................... 701/50
See application file for complete search history.

(56) References Cited

U.S. PATENT DOCUMENTS

| | | | | |
|---|---|---|---|---|
| 3,997,071 A | * | 12/1976 | Teach | 414/698 |
| 4,255,883 A | * | 3/1981 | Ealy | 37/348 |
| 4,318,663 A | * | 3/1982 | Waite | 414/707 |
| 4,820,041 A | * | 4/1989 | Davidson et al. | 356/3.12 |
| 5,365,442 A | * | 11/1994 | Schmidt | 701/50 |
| 5,469,646 A | | 11/1995 | Takamura | |
| 5,513,551 A | * | 5/1996 | Morishita | 91/459 |
| 6,064,933 A | | 5/2000 | Rocke | |
| 6,763,618 B1 | * | 7/2004 | Moran | 37/301 |
| 6,845,311 B1 | * | 1/2005 | Stratton et al. | 701/50 |
| 6,954,999 B1 | * | 10/2005 | Richardson et al. | 37/348 |
| 7,364,003 B2 | | 4/2008 | Holt | |
| 7,953,559 B2 | | 5/2011 | Sundermeyer | |
| 2005/0263302 A1 | * | 12/2005 | Newnam | 172/817 |
| 2006/0096137 A1 | * | 5/2006 | Hendron et al. | 37/348 |
| 2007/0131438 A1 | * | 6/2007 | Brandt et al. | 172/464 |
| 2009/0018730 A1 | | 1/2009 | Tarasinski | |
| 2009/0088931 A1 | * | 4/2009 | Budde et al. | 701/50 |
| 2009/0159302 A1 | * | 6/2009 | Koch et al. | 172/2 |
| 2009/0193798 A1 | * | 8/2009 | Gruel | 60/325 |
| 2011/0190942 A1 | * | 8/2011 | Nicholson et al. | 700/275 |
| 2013/0274925 A1 | * | 10/2013 | Oates et al. | 700/275 |

\* cited by examiner

*Primary Examiner* — Calvin Cheung
(74) *Attorney, Agent, or Firm* — Baker Hostetler (57) ABSTRACT

The disclosure describes a control system for controlling the movement of an implement associated with a machine. The control system includes a speed sensor, a grade control system, an implement position sensor, and a controller. The speed sensor is configured to generate a speed signal indicative of a machine speed. The grade control system is configured to generate a desired implement position signal indicative of a desired implement position. The implement position sensor is configured to generate an implement position signal indicative of a position of the implement. The controller is configured to generate a machine control command to move the implement as a function of the speed signal, the desired implement position signal, and the implement position signal.

17 Claims, 4 Drawing Sheets

| [P] | Load Factor 1 | Load Factor 2 | Load Factor 3 | Load Factor 4 | Load Factor 5 |
|---|---|---|---|---|---|
| Speed Parameter 1 | Gp11 | Gp12 | Gp13 | Gp14 | Gp15 |
| Speed Parameter 2 | Gp21 | Gp22 | Gp23 | Gp24 | Gp25 |
| Speed Parameter 3 | Gp31 | Gp32 | Gp33 | Gp34 | Gp35 |
| Speed Parameter 4 | Gp41 | Gp42 | Gp43 | Gp44 | Gp45 |
| Speed Parameter 5 | Gp51 | Gp52 | Gp53 | Gp54 | Gp55 |

| [I] | Load Factor 1 | Load Factor 2 | Load Factor 3 | Load Factor 4 | Load Factor 5 |
|---|---|---|---|---|---|
| Speed Parameter 1 | Gi11 | Gi12 | Gi13 | Gi14 | Gi15 |
| Speed Parameter 2 | Gi21 | Gi22 | Gi23 | Gi24 | Gi25 |
| Speed Parameter 3 | Gi31 | Gi32 | Gi33 | Gi34 | Gi35 |
| Speed Parameter 4 | Gi41 | Gi42 | Gi43 | Gi44 | Gi45 |
| Speed Parameter 5 | Gi51 | Gi52 | Gi53 | Gi54 | Gi55 |

| [D] | Load Factor 1 | Load Factor 2 | Load Factor 3 | Load Factor 4 | Load Factor 5 |
|---|---|---|---|---|---|
| Speed Parameter 1 | Gd11 | Gd12 | Gd13 | Gd14 | Gd15 |
| Speed Parameter 2 | Gd21 | Gd22 | Gd23 | Gd24 | Gd25 |
| Speed Parameter 3 | Gd31 | Gd32 | Gd33 | Gd34 | Gd35 |
| Speed Parameter 4 | Gd41 | Gd42 | Gd43 | Gd44 | Gd45 |
| Speed Parameter 5 | Gd51 | Gd52 | Gd53 | Gd54 | Gd55 |

FIG. 4

SYSTEM AND METHOD FOR MACHINE CONTROL

TECHNICAL FIELD

The present disclosure relates generally to a control system, and more particularly to systems and methods for controlling an implement to maximize machine productivity and protect/improve a final grade.

BACKGROUND

Earthmoving machines such as track type tractors, motor graders, scrapers, and/or backhoe loaders, have an implement such as a dozer blade or bucket, which is used on a worksite in order to alter a geography or terrain of a section of earth. The implement may be controlled by an operator or by an autonomous grade control system to perform work on the worksite. For example, the operator may move an operator input device that controls the movement of the implement using one or more hydraulic actuators. To achieve a final surface contour or a final grade, the implement may be adjusted to various positions by the operator or the grade control system.

Positioning the implement, however, is a complex and time-consuming task that requires expert skill and diligence if the operator is controlling the movement. Thus, it is often desirable to provide the autonomous grade control system for the implement to simplify the operator control. Prior art systems that automatically control the implement are known. For example, U.S. Pat. No. 6,064,933 discloses an automatic control system for positioning the implement of an earthmoving machine in accordance with a stored sequence of control command signals.

SUMMARY

Disclosed is a control system for controlling the movement of an implement associated with a machine. The control system includes a speed sensor, a grade control system, an implement position sensor, and a controller. The speed sensor is configured to generate a speed signal indicative of a machine speed. The grade control system is configured to generate a desired implement position signal indicative of a desired implement position. The implement position sensor is configured to generate an implement position signal indicative of a position of the implement. The controller is configured to generate a machine control command to move the implement as a function of the speed signal, the desired implement position signal, and the implement position signal.

Further disclosed is a method for controlling the movement of an implement associated with a machine. The method includes sensing the machine speed, determining a desired implement position with a grade control system, sensing a position of the implement, and generating a machine control command to move the implement as a function of the machine speed, the desired implement position, and the position of the implement.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
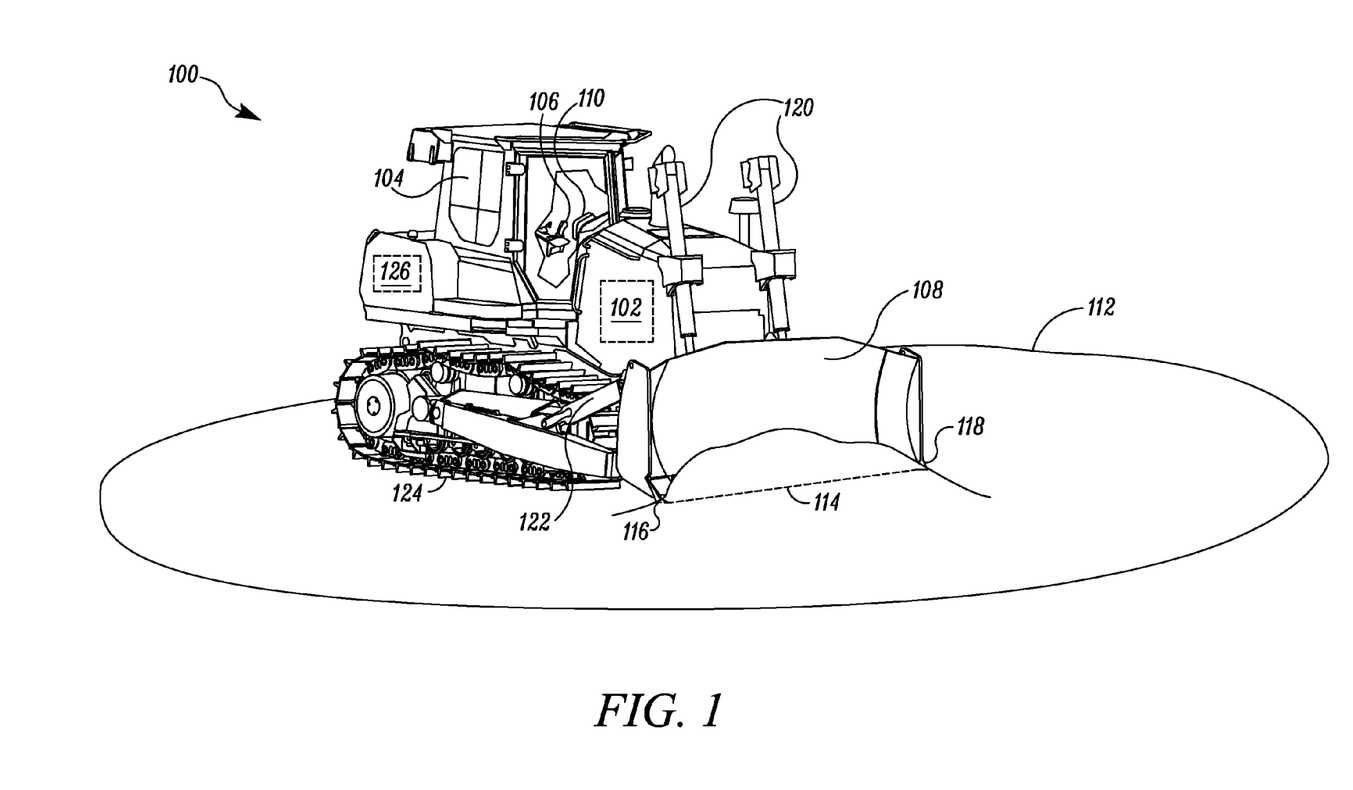
FIG. 1 illustrates a machine having a control system in accordance with an exemplary embodiment of the present disclosure.

The present disclosure relates to systems and methods for controlling an implement to maximize machine productivity. An exemplary embodiment of a machine 100 is shown schematically in FIG. 1. The machine 100 may be a mobile machine that performs operations associated with industries such as mining, construction, farming, transportation, or the like. For example, the machine 100 may be a track type tractor or dozer, as depicted in FIG. 1, a motor grader, or other earth-moving machine known in the art. While the following detailed description describes an exemplary embodiment in connection with a track type tractor, it should be appreciated that the description applies equally to the use of the present disclosure in other machines.

In an illustrated embodiment, the machine 100 includes a power source 102 and an operator's station or cab 104. The machine 100 further includes an implement 108, such as, for example, a blade or a shovel for moving earth. The cab 104 may include a user interface 110 necessary to operate the machine 100. The user interface 110 may include, for example, one or more operator input devices 106 for propelling the machine 100 and/or controlling other machine components. The one or more operator input devices 106 may include one or more joysticks provided within the cab 104, and adapted to receive input from an operator indicative of a desired movement of the implement 108.

For simplification purposes, only one operator input device 106 embodied as a joystick will be discussed and shown in the figures. The user interface 110 may also include a display for conveying information to the operator and may include a keyboard, touch screen, or any suitable mechanism for receiving input from the operator to control and/or operate the machine 100, the implement 108, and/or the other machine components.

The implement 108 may be adapted to engage, penetrate, or cut the surface of a worksite 112 and may be further adapted to move the earth to accomplish a predetermined task. The worksite 112 may include, for example, a mine site, a landfill, a quarry, a construction site, or any other type of worksite. Moving the earth may be associated with altering the geography at the worksite 112 and may include, for example, a grading operation, a scraping operation, a leveling operation, a material removal operation, or any other type of geography altering operation at the worksite 112.

In the illustrated embodiment, the implement 108 includes a cutting edge 114 that extends between a first end 116 and a second end 118. The first end 116, of the cutting edge 114 of the implement 108, may represent a right tip or right edge of the implement 108 and the second end 118, of the cutting edge 114 of the implement 108, may represent a left tip or left edge of the implement 108. In an embodiment, the implement 108 may be moveable by one or more hydraulic mechanisms operatively connected to the operator input device 106 provided in the cab 104.

The hydraulic mechanisms may include one or more hydraulic lift actuators 120 and one or more hydraulic tilt actuators 122, for moving the implement 108 to various positions, such as, for example, lifting the implement 108 up or lowering the implement 108 down, and tilting the implement 108 left or right. In the illustrated embodiment, the machine 100 includes one hydraulic lift actuator 120 and one hydraulic tilt actuator 122 on each side of the implement 108. The illustrated embodiment shows two hydraulic lift actuators 120, but only one of the two hydraulic tilt actuators 122 is shown (only one side shown). Moreover, the hydraulic mechanism may also include one or more hydraulic push cylinders (not shown) for pitching the implement 108 in forward or backward direction.

The power source 102 may be an engine that provides power to a ground engaging mechanism 124 adapted to support, steer, and propel the machine 100. The power source 102 may embody an engine such as, for example, a diesel engine, a gasoline engine, a gaseous fuel-powered engine, or any other type of combustion engine known in the art. It is contemplated that the power source 102 may alternatively embody a non-combustion source of power (not shown) such as, for example, a fuel cell, a power storage device, or another suitable source of power. The power source 102 may produce a mechanical or electrical power output that may be converted to hydraulic power for providing power to the ground engaging mechanism 124, the implement 108, and to other machine components.

Figure 2:
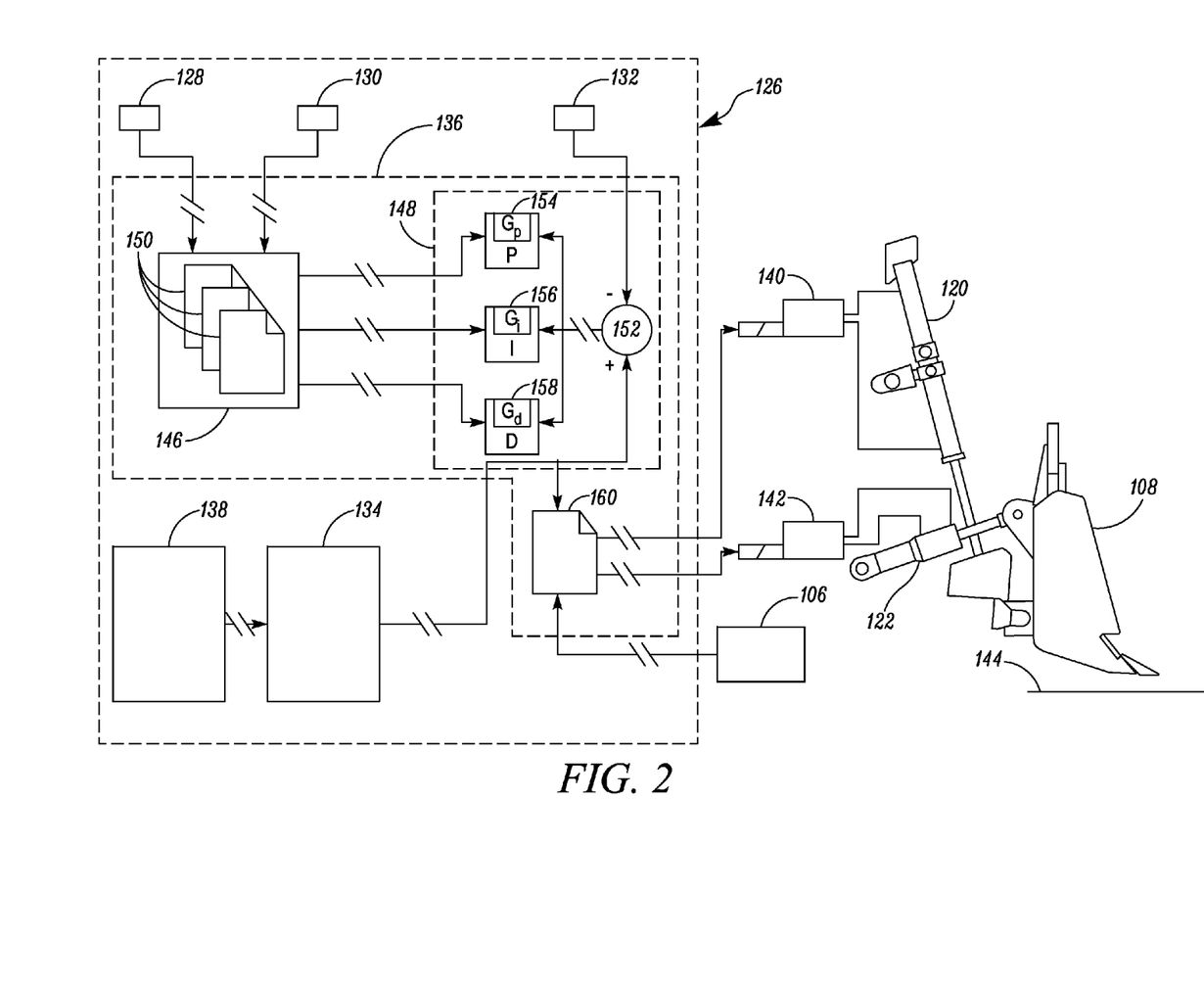
FIG. 2 illustrates the control system to control the movement of an implement in accordance with an exemplary embodiment of the present disclosure.

The machine 100 may further include a control system 126 operatively connected to the operator input device 106 and to the hydraulic actuators 120, 122 for controlling movement of the implement 108. As illustrated in FIG. 2, the control system 126 includes a load sensor 128, a speed sensor 130, and an implement position sensor 132. In an embodiment, the load sensor 128 may include one or more torque sensors or pressure transducers or temperature sensors or the like, associated with the power source 102 of the machine 100 and configured to generate a load signal indicative of a loading condition of the implement 108. Alternatively, the load sensor 128 may include strain gauges or pressure transducers coupled to the implement 108 and/or the hydraulic actuators 120, 122 to measure and quantify an amount of dirt/material carried by the implement 108. In some alternative embodiments, the load sensor 128 may include a system which estimates the loading condition of the implement 108 as functions of other measured parameters. Load sensors 128 are known by ordinary persons skilled in the art. The speed sensor 130 may be associated with the ground engaging mechanism 124, and configured to generate a speed signal indicative of a machine speed. In an alternative embodiment, the speed sensor 130 may be a system associated with a GPS system. Further, the implement position sensor 132 may be associated with the implement 108 and/or the hydraulic actuators 120, 122 and configured to generate an implement position signal indicative of a position of the implement 108.

The control system 126 further includes a grade control system 134, and a controller 136. The controller 136 is adapted to receive inputs from the operator input device 106 and/or the grade control system 134 to control the movement of the implement 108 based on the loading condition of the implement 108, the machine speed, and the position of the implement 108 individually or collectively in pre-determined combinations. The grade control system 134 and the controller 136 may include one or more control modules (e.g. ECMs, ECUs, etc.). The one or more control modules may include processing units, memory, sensor interfaces, and/or control signal interfaces (for receiving and transmitting signals). The processing units may represent one or more logic and/or processing components used by the control system 126 to perform certain communications, control, and/or diagnostic functions. For example, the processing units may be adapted to execute routing information among devices within and/or external to the control system 126.

According to an aspect of the present disclosure, the controller 136 may direct the implement 108 to move to a desired implement position in response to a desired position signal received from the grade control system 134. The desired position signal is indicative of an automatically determined position of the implement 108 by the grade control system 134. The desired position signal indicative of the automatically determined position of the implement 108 may include a desired elevational signal, such as, for example, the height it is desired to have the blade 108 above the worksite 112. The desired position signal may or may not include a desired tilt angle of the blade. In an embodiment of the present disclosure, the controller 136 may process the desired position signal, the speed signal, the implement position signal, and the load signal to output a machine control command to actuate the implement 108. As will be apparent to a person skilled in the art, the machine control command may command an electrical current of a determined magnitude, to actuate hydraulic valves 140, and 142 associated with the hydraulic actuators 120 and 122, respectively.

Moreover, the automatically determined desired position of the implement 108 may be based on an input received from a site design 138. The site design 138 may include data related to a construction surface of the worksite 112 based on an engineering design. The construction surface provided in the site design 138 may represent a ground profile indicative of an irregular three-dimension (3D) surface or a flat plane. As illustrated in FIG. 2, the construction surface is a design plane 144 that represents a desired cutting plane or a final grade for the worksite 112. The grade control system 134 may be adapted to determine a relative desired location or position of the implement 108 with respect to the design plane 144. Moreover, the grade control system 134 may be adapted to determine a relative location or position of the machine 100 within the worksite 112. The relative location or position of the machine 100 and/or the implement 108 may be determined using one or more position sensors, GPS receivers, and/or laser systems, which are well-known in the art. In the illustrated embodiment, the grade control system 134 receives the input from the site design 138 indicative of the design plane 144 for the worksite 112 and the relative position of the implement 108 with respect to the design plane 144 and outputs the desired position signal as a function of these inputs.

According to an embodiment of the present disclosure, the controller 136 may include a modulation map 146, and a closed loop implement position control 148. The controller 136 is configured to process signals, received from the load sensor 128, and the speed sensor 130. The modulation map 146 may include a number of data tables 150 to store and dynamically update load factors and speed parameters associated with the machine 100, based on the signals received from the load sensor 128 and the speed sensor 130, respectively. In an embodiment, the load factors may represent normalized or pre-assigned values corresponding to the loading condition of the implement 108 during the operation, such as, a low load, a moderate load, and a high load. Further, the speed parameters may represent normalized or pre-assigned values based on at least one of the machine speed, track pitch, and engine rpm. In another embodiment of the present disclosure, the modulation map 146 may include, but not limited to, a set of modulation functions based on known mathematical equations to dynamically update the data tables 150 with the load factors and the speed parameters.

Further, the closed loop implement position control 148 may be configured to calculate and minimize an error value, which is indicative of a difference between the position of the implement 108 determined by the implement position sensor 132 and the automatically determined desired position of the implement 108 by the grade control system 134. The closed loop implement position control 148 may include an adder 152 adapted to combine or process the desired position signal, and the implement position signal to output an implement position error signal. The implement position error signal is indicative of the error value based on the implement position signal and the desired position signal. It will be apparent to a person having ordinary skill in the art that, the adder 152 may act as an electronic signal multiplier or an electronic mixer that combines two or more electrical or electronic signals to output a composite signal. The adder 152 may include transistors and/or diodes arranged in a circuit to achieve the purpose.

According to an embodiment of the present disclosure, the closed loop implement position control 148 may include a proportional-integral-derivative controller (PID controller) using a PID controller algorithm well known in the art. The closed loop implement position control 148 may include a proportional control 154, an integral control 156, and a derivative control 158. It may be apparent to a person having ordinary skill in the art that, the PID controller algorithm may include a proportional gain factor (P), an integral gain factor (I), and a derivative gain factor (D) associated with the proportional control 154, the integral control 156, and the derivative control 158 respectively. The PID controller may scale the error value as a function of the machine speed and/or the loading condition of the implement. In an embodiment illustrated, the proportional gain factor (P), the integral gain factor (I), and the derivative gain factor (D) may include a dynamic proportional gain ($G_P$), a dynamic integral gain ($G_I$), and a dynamic derivative gain ($G_D$) which may be determined as a function of the load signal and the speed signal.

Further, PID controller algorithm may include calculating and generating the machine control command as a function of a pre-determined combination of the proportional gain factor (P), the integral gain factor (I), the derivative gain factor (D), and the implement position error signal. The machine control command may attempt to minimize the error value, the difference between the position of the implement 108 and the automatically determined position of the implement 108, by controlling the current to actuate hydraulic valves 140, and 142 associated with the hydraulic actuators 120 and 122, respectively. The controller 136 may further include a look-up table 160 including, but not limited to, a set of modulation functions or a pre-defined look-up table for validating the machine control command and output electric signals corresponding to the current to actuate hydraulic valves 140, and 142.

Figure 3:
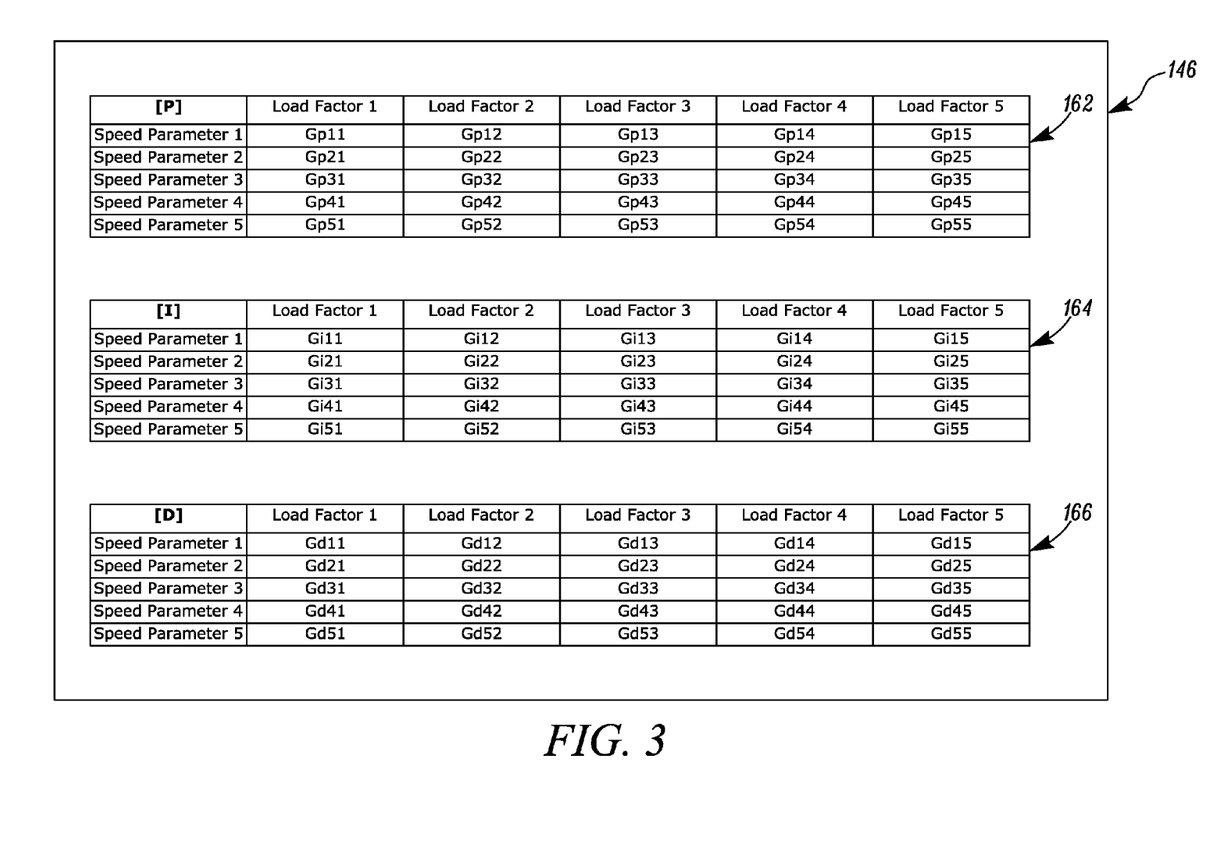
FIG. 3 illustrates a modulation map in accordance with an exemplary embodiment of the present disclosure.

FIG. 3 illustrates an exemplary modulation map 146, according to an embodiment of the present disclosure. As illustrated, the modulation map 146 may include a set of two-dimensional arrays 162, 164, and 166 to store the dynamic proportional gain ($G_P$), the dynamic integral gain ($G_I$), and the dynamic derivative gain ($G_D$) corresponding to various values of the load factors and speed parameters stored in the data tables 150. In an exemplary embodiment, the two-dimensional array 162 may include values for the dynamic proportional gain ($G_P$) corresponding to a pre-determined combinations of load factors and speed parameters. Similarly, the two-dimensional arrays 164, 166 may include values for the dynamic integral gain ($G_I$), and the dynamic derivative gain ($G_D$), respectively, corresponding to the predetermined combinations of load factors and speed parameters.

According to another aspect of the present disclosure, the controller 136 may also direct the implement 108 to move to an operator determined position in response to an operator input signal received from the operator input device 106. The operator determined position is indicative of a position representing an operator's desired movement of the implement 108. The operator input signal may also include an elevational signal, such as, for example, a lower implement signal or a raise implement signal. The operator inputs signal indicative of the operators' desired movement of the implement 108 may also include a tilt signal, such as, for example, tilt left and tilt right signals. In an embodiment of the present disclosure, the controller 136 may process the operator input signal and the load factor received from the data table 150 to output the machine control command to move the implement 108.

Further, the controller 136 is adapted receive the operator input signal generated by the operator input device 106 or the grade control signal generated by the grade control system 134, and generate the machine control command to move the implement 108 to the operator determined position or predetermined target position, respectively. Thus, the machine control command actuates the hydraulic actuators 140, 142 to move the implement 108 to the corresponding target position. Moving the implement 108 may include a cut to the corresponding target position or a lift to the corresponding target position.

INDUSTRIAL APPLICABILITY

The industrial applicability of the systems and methods for controlling the implement 108 to maximize machine productivity described herein will be readily appreciated from the foregoing discussion. Although, the machine 100 is shown as a track-type tractor, the machine 100 may be any type of machine that performs at least one operation associated with for example mining, construction, and other industrial applications. Moreover, the systems and methods described herein can be adapted to a large variety of machines and tasks. For example, backhoe loaders, skid steer loaders, wheel loaders, motor graders, and many other machines can benefit from the systems and methods described.

Conventional machines may use either the operator input signal or the desired position signal from the automatic grade control system to control the movement of the implement 108. Varying loading conditions of the implement 108 and speeds of the machine 100 may change the natural frequencies of the machine 100 and/or implement 108. Conventional control systems associated with the implement 108 are designed with fixed proportional, integral and derivative gains and it may become unstable when the machine speed and/or the loading condition of the implement 108 are in some ranges. In such cases, the final grade or grading quality may be not close to a desired one as the implement 108 or the machine 100 may experience unanticipated resonance at a given machine speed and/or the loading condition of the implement 108. In an aspect of the present disclosure, the control system 126 receives the inputs corresponding to the load factor/speed parameters and controls the movement of the implement 108 to achieve the final grade as a function of varying machine speed and/or the loading conditions of the implement 108.

Figure 4:
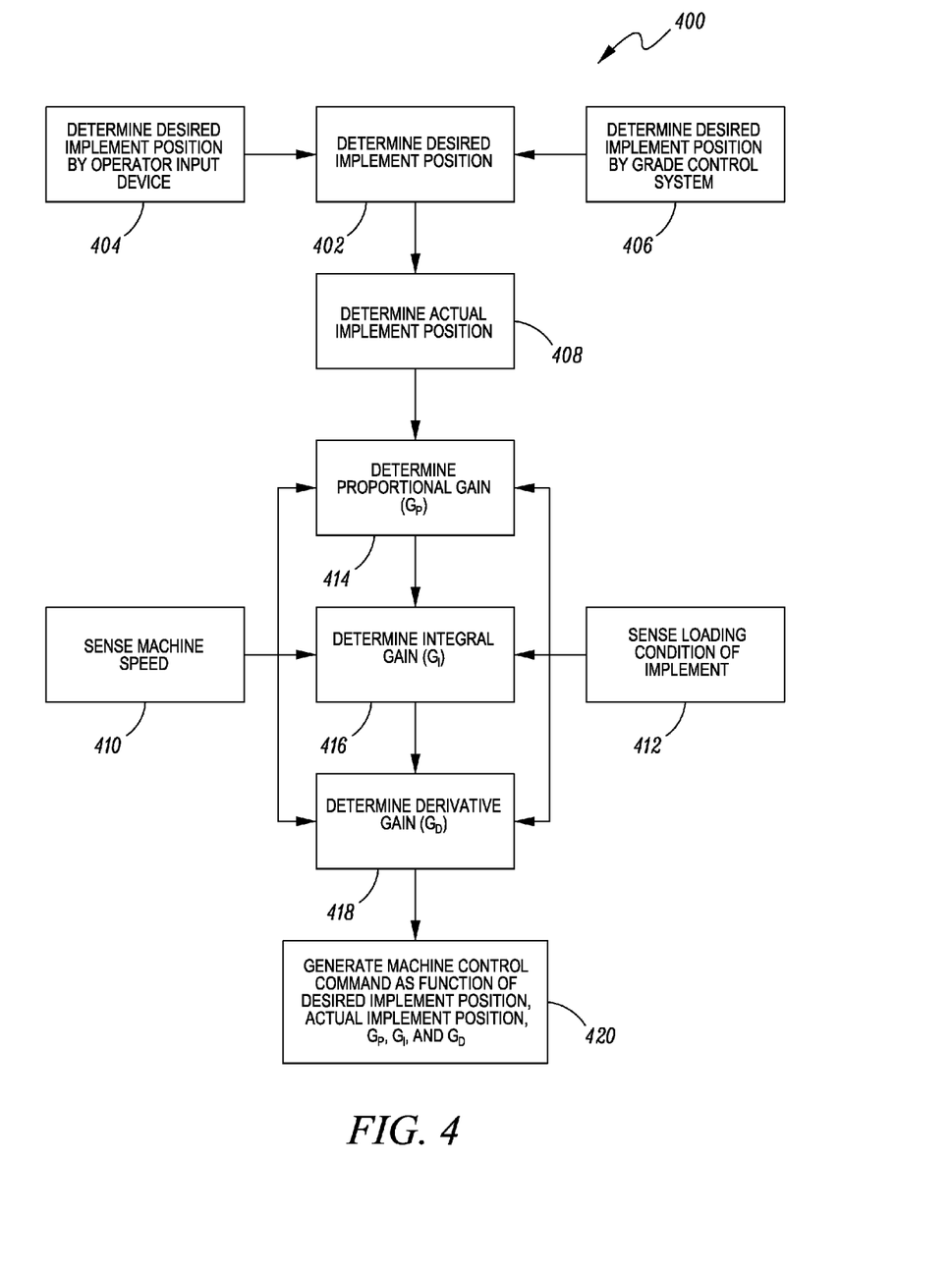
FIG. 4 illustrates a process flow diagram for an exemplary method to control a movement of an implement, according to an aspect of the present disclosure.

In accordance with the various embodiments, the control system 126 is adapted to process the desired position signal generated by the grade control system 134 or the operator input devices 106, the load signal, and the speed signal to generate the machine control command to move the implement 108. FIG. 4 illustrates a process flow diagram for an exemplary method 400 to control a movement of the implement 108, according to an aspect of the present disclosure. The method 400 may be implemented by the controller 136.

At step 402 of the method 400, the controller 136 is adapted to determine the desired implement position. The desired implement position may be determined either by the operator input device 106 or by the automatic grade control system 134. In one embodiment, depicted by step 404, where the desired implement position is determined by the operator input device 106, for example when an operator may move a joystick to indicate a position he/she desired the implement 108 to move to. In another embodiment, depicted by step 406, where the desired implement position is determined by the automatic grade control system 134, the grade control system 134 generates the desired implement position signal. The method 400 proceeds from step 402 to step 408.

At step 408, the controller 136 senses an actual position of the implement 108 as a function of the implement position signal generated by the implement position sensor 132. In an embodiment of the present disclosure, the method 400 may also include receiving various signals/inputs corresponding to a dirt/material condition of worksite 112.

At step 410 the controller 136 is configured to sense the machine speed as a function of a speed signal generated by the speed sensor 130. As described above, the speed parameters corresponding to the sensed machine speed may be dynamically updated in the modulation map 146.

At step 412, the controller 136 senses the loading condition of the implement 108 as a function of the load signal generated by the load sensor 128. The load factors corresponding to the sensed loading condition of the implement 108 may also be dynamically updated in the modulation map 146.

The machine 100 and/or the implement 108 may include a natural resonance at some frequencies. These natural frequencies may change depending on the machine speed and the loading condition of the implement 108. If a closed loop control system also operates at one of the machine 100 or implement 108 natural frequencies, the closed loop control system may become unstable. Using dynamic gains, determined as a function of machine speed and the loading condition of the implement 108, may prevent instability.

At step 414, the controller 136 determines the dynamic proportional gain ($G_P$) as a function of the machine speed and the loading condition of the implement 108. As previously described in relation to FIG. 3, the controller 136 may include an exemplary modulation map 146. The modulation map 146 may include the set of two-dimensional arrays 162 storing the dynamic proportional gain ($G_P$) corresponding to various values of the machine speed and the loading condition of the implement 108. In one embodiment, the controller 136 may determine the dynamic proportional gain ($G_P$) through looking up the dynamic proportional gain ($G_P$) in the modulation map 146. The method 400 proceeds to step 416.

At step 416, the controller 136 determines the dynamic integral gain ($G_I$) as a function of the machine speed and the loading condition of the implement 108. The modulation map 146 may include the set of two-dimensional arrays 164, storing the dynamic integral gain ($G_I$) corresponding to various values of machine speed and the loading condition of the implement 108. In one embodiment, the controller 136 may determine the dynamic integral gain ($G_I$) through looking up the dynamic integral gain ($G_I$) in the modulation map 146. The method 400 proceeds to step 418.

At step 418, the controller 136 determines the dynamic derivative gain ($G_D$) as a function of the machine speed and the loading condition of the implement 108. The modulation map 146 may include the set of two-dimensional arrays 166 storing the dynamic derivative gain ($G_D$) corresponding to various values of machine speed and the loading condition of the implement 108. In one embodiment, the controller 136 may determine the dynamic derivative gain ($G_D$) through looking up the dynamic derivative gain ($G_D$) in the modulation map 146. The method 400 proceeds to step 420.

At step 420, the controller 136 may generate the machine command signal to move the implement 108 to the desired position as a function of the desired position, the actual position, the dynamic proportional gain ($G_P$), the dynamic integral gain ($G_I$), and the dynamic derivative gain ($G_D$).

Aspects of this disclosure may also be applied to other machines. Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

We claim:

1. A control system for controlling movement of an implement associated with a machine, the control system comprising:
   a speed sensor configured to generate a speed signal indicative of a machine speed;
   a grade control system configured to generate a desired implement position signal indicative of a desired implement position;
   an implement position sensor configured to generate an implement position signal indicative of a position of the implement; and
   a controller configured to generate a machine control command to move the implement as a function of the speed signal, the desired implement position signal, and the implement position signal, wherein the controller includes a closed loop implement position control, and wherein the closed loop implement position control includes a proportional control including a dynamic proportional gain, the dynamic proportional gain determined as a function of a pre-determined speed parameter.

2. The control system of claim 1 further including,
   a load sensor configured to generate a load signal indicative of a loading condition of the implement; and
   wherein the machine control command is determined as a function of the load signal.

3. The control system of claim 1, wherein the grade control system is further configured to:
   receive an input related to a design plane from a site design;
   determine a relative position of the implement with respect to the design plane; and
   output the desired implement position signal as a function of the design plane and the relative position of the implement with respect to the design plane.

4. The control system of claim 1, wherein the dynamic proportional gain is determined as a function of a load signal indicative of a loading condition of the implement.

5. A control system for controlling movement of an implement associated with a machine, the control system comprising:
- a speed sensor configured to generate a speed signal indicative of a machine speed;
- a grade control system configured to generate a desired implement position signal indicative of a desired implement position;
- an implement position sensor configured to generate an implement position signal indicative of a position of the implement; and
- a controller configured to generate a machine control command to move the implement as a function of the speed signal, the desired implement position signal, and the implement position signal, wherein the controller includes a closed loop implement position control configured to calculate and minimize an error value, the error value indicative of the difference between the position of the implement and the desired position of the implement, and wherein the closed loop implement position control includes an integral control including a dynamic integral gain, the dynamic integral gain determined as a function of the speed signal.

6. The control system of claim 5, wherein the dynamic integral gain is determined as a function of a load signal indicative of a loading condition of the implement.

7. A control system for controlling movement of an implement associated with a machine, the control system comprising:
- a speed sensor configured to generate a speed signal indicative of a machine speed;
- a grade control system configured to generate a desired implement position signal indicative of a desired implement position;
- an implement position sensor configured to generate an implement position signal indicative of a position of the implement; and
a controller configured to generate a machine control command to move the implement as a function of the speed signal, the desired implement position signal, and the implement position signal, wherein the controller includes a closed loop implement position control configured to calculate and minimize an error value, the error value indicative of the difference between the position of the implement and the desired position of the implement, and wherein the closed loop implement position control includes a derivative control including a dynamic derivative gain, the dynamic derivative gain determined as a function of the speed signal.

8. The control system of claim 7, wherein the dynamic derivative gain is determined as a function of a load signal indicative of a loading condition of the implement.

9. A method for controlling movement of an implement associated with a machine, the method comprising:
- sensing a machine speed;
- determining a desired implement position with a grade control system;
- sensing a position of the implement; and
- generating a machine control command, by a controller, to move the implement as a function of the machine speed, the desired implement position, and the position of the implement, wherein the controller includes a closed loop implement position control, and wherein the closed loop implement position control includes a proportional control including a dynamic proportional gain, the dynamic proportional gain determined as a function of a pre-determined speed parameter.

10. The method of claim 9, further including:
sensing a loading condition of the implement; and
generating the machine control command as a function of the loading condition of the implement.

11. The method of claim 9, further including:
receiving an input related to a design plane from a site design;
determining a relative position of the implement with respect to the design plane; and
determining the desired implement position as a function of the design plane and the relative position of the implement with respect to the design plane.

12. A method for controlling movement of an implement associated with a machine, the method comprising:
sensing a machine speed;
determining a desired implement position with a grade control system;
sensing a position of the implement;
generating a machine control command to move the implement as a function of the machine speed, the desired implement position, and the position of the implement;
calculating and minimizing an error value with a closed loop implement position control, the error value indicative of the difference between the position of the implement and the desired implement position;
determining a proportional gain factor for a proportional scaling of the error value as a function of the machine speed; and
generating the machine control command as a function of the proportional gain factor.

13. The method of claim 12, further including:
sensing a loading condition of the implement; and
determining the proportional gain factor as a function of the loading condition of the implement.

14. A method for controlling movement of an implement associated with a machine, the method comprising:
sensing a machine speed;
determining a desired implement position with a grade control system;
sensing a position of the implement;
generating a machine control command to move the implement as a function of the machine speed, the desired implement position, and the position of the implement;
calculating and minimizing an error value with a closed loop implement position control, the error value indicative of the difference between the position of the implement and the desired implement position;
determining an integral gain factor for an integral scaling of the error value as a function of the machine speed; and
generating the machine control command as a function of the integral gain factor.

15. The method of claim 14, further including:
sensing a loading condition of the implement; and
determining the integral gain factor as a function of the loading condition of the implement.

16. A method for controlling movement of an implement associated with a machine, the method comprising:
sensing a machine speed;
determining a desired implement position with a grade control system;
sensing a position of the implement;
generating a machine control command to move the implement as a function of the machine speed, the desired implement position, and the position of the implement;
calculating and minimizing an error value with a closed loop implement position control, the error value indicative of the difference between the position of the implement and the desired implement position;
determining a derivative gain factor for a derivative scaling of the error value as a function of the machine speed; and
generating the machine control command as a function of the derivative gain factor.

17. The method of claim 16, further including:
sensing a loading condition of the implement; and
determining the derivative gain factor as a function of the loading condition of the implement.

* * * * *